United States Patent
Zhang et al.

(10) Patent No.: US 11,264,684 B2
(45) Date of Patent: Mar. 1, 2022

(54) LIQUID CRYSTAL PHASE SHIFTER COMPRISING A LIQUID CRYSTAL CELL WITH FIRST AND SECOND SUBSTRATES SEPARATED BY A PARTITION PLATE HAVING FIRST AND SECOND MICROSTRIPS ON OPPOSING SURFACES OF THE PLATE

(71) Applicant: BOE TECHNOLOGY GROUP CO., LTD., Beijing (CN)

(72) Inventors: Pengju Zhang, Beijing (CN); Mingxing Liu, Beijing (CN); Haiyan Sun, Beijing (CN); Rui Li, Beijing (CN); Hao Miao, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 77 days.

(21) Appl. No.: 16/609,819

(22) PCT Filed: Apr. 4, 2019

(86) PCT No.: PCT/CN2019/081575
§ 371 (c)(1),
(2) Date: Oct. 31, 2019

(87) PCT Pub. No.: WO2019/196749
PCT Pub. Date: Oct. 17, 2019

(65) Prior Publication Data
US 2020/0067160 A1    Feb. 27, 2020

(30) Foreign Application Priority Data
Apr. 13, 2018 (CN) .......................... 201810333111.2

(51) Int. Cl.
*H01P 1/18* (2006.01)
*G02F 1/13* (2006.01)
(Continued)

(52) U.S. Cl.
CPC ............ *H01P 1/181* (2013.01); *G02F 1/1326* (2013.01); *G02F 1/31* (2013.01); *H01P 1/18* (2013.01);
(Continued)

(58) Field of Classification Search
CPC .. H01P 1/18; H01P 1/181; H01P 1/184; H01P 3/084; H01P 3/087; H01P 9/00; H01Q 3/34; H01Q 3/36
(Continued)

(56) References Cited

U.S. PATENT DOCUMENTS 3,518,688 A * 6/1970 Stayboldt et al. ... H01Q 21/064
343/771
5,712,607 A * 1/1998 Dittmer et al. ......... H01P 3/087
333/238
(Continued)

FOREIGN PATENT DOCUMENTS

CN       101341626 A       1/2009
CN       101449203 A       6/2009
(Continued)

OTHER PUBLICATIONS

International Search Report and Written Opinion issued in corresponding PCT/CN2019/081575, dated Jul. 1, 2019, with English translation.
(Continued)

*Primary Examiner* — Benny T Lee
(74) *Attorney, Agent, or Firm* — McDermott Will and Emery LLP

(57) ABSTRACT

A liquid crystal phase shifter is disclosed. The liquid crystal phase shifter includes a liquid crystal cell, a partition plate,
(Continued)

a first microstrip line, a second microstrip line and liquid crystal molecules. The liquid crystal cell includes a first substrate and a second substrate disposed opposite to each other; the partition plate is disposed between the first substrate and the second substrate; the first microstrip line is disposed on a surface of the partition plate away from the second substrate; the second microstrip line is disposed on a surface of the partition plate away from the first substrate; and the liquid crystal molecules are provided between the first substrate and the partition plate, and between the second substrate and the partition plate.

20 Claims, 7 Drawing Sheets

(51) Int. Cl.
  *G02F 1/31* (2006.01)
  *H01P 3/08* (2006.01)
  *H01Q 3/36* (2006.01)
  *H01P 9/00* (2006.01)

(52) U.S. Cl.
  CPC .............. *H01P 1/184* (2013.01); *H01P 3/081* (2013.01); *H01P 9/00* (2013.01); *H01Q 3/36* (2013.01)

(58) Field of Classification Search
  USPC .................................................. 333/156, 161
  See application file for complete search history.

(56) References Cited

U.S. PATENT DOCUMENTS

| | | | |
|---|---|---|---|
| 9,588,374 | B2 | 3/2017 | Anderson et al. |
| 2010/0019865 | A1 | 1/2010 | Baron et al. |
| 2014/0022029 | A1 | 1/2014 | Glushchenko et al. |
| 2016/0377906 | A1 | 12/2016 | Feuillade et al. |
| 2020/0067160 | A1 | 2/2020 | Zhang et al. |
| 2020/0089042 | A1 | 3/2020 | Cao et al. |

FOREIGN PATENT DOCUMENTS

| | | | |
|---|---|---|---|
| CN | 105960609 | A | 9/2016 |
| CN | 106025452 | A | 10/2016 |
| CN | 106684551 | A | 5/2017 |
| CN | 106773338 | A | 5/2017 |
| CN | 108511858 | A | 9/2018 |
| EP | 0472404 | A2 | 2/1992 |
| JP | H04245803 | A | 9/1992 |
| WO | 2007122409 | A1 | 11/2007 |
| WO | 2010063307 | A1 | 6/2010 |

OTHER PUBLICATIONS

Notification to Grant Patent Right for Invention issued in corresponding Chinese Patent Application No. 201810333111.2, dated Mar. 17, 2020, with English translation.

First Office Action issued in corresponding Chinese Patent Application No. 201810333111.2, dated May 27, 2019, with English translation.

Second Office Action issued in corresponding Chinese Patent Application No. 201810333111.2, dated Dec. 3, 2019, with English translation.

* cited by examiner

LIQUID CRYSTAL PHASE SHIFTER COMPRISING A LIQUID CRYSTAL CELL WITH FIRST AND SECOND SUBSTRATES SEPARATED BY A PARTITION PLATE HAVING FIRST AND SECOND MICROSTRIPS ON OPPOSING SURFACES OF THE PLATE

CROSS-REFERENCE TO RELATED APPLICATIONS

This application is a national phase entry under 35 USC 371 of International Patent Application No. PCT/CN2019/081575 filed on Apr. 4, 2019, which claims priority to Chinese Patent Application No. 201810333111.2, filed with the Chinese Patent Office on Apr. 13, 2018, titled "LIQUID CRYSTAL PHASE SHIFTER AND ELECTRONIC DEVICE", which are incorporated herein by reference in their entireties.

TECHNICAL FIELD

The present disclosure relates to the field of signal transmission, and in particular, to a liquid crystal phase shifter and an electronic device.

BACKGROUND

A phase shifter is a device that can adjust a phase of a signal wave. The phase shifter has a wide range of applications in the fields of radar, missile attitude control, accelerators, communication and instruments. By adjusting circuit parameters, the phase shifter may continuously or discontinuously change the phase of the signal wave without changing the amplitude of the signal wave. That is, the signal wave may pass through the phase shifter without distortion, but the phase of the signal wave is changed. Currently, commonly used phase shifters mainly include varactor diode phase shifters, ferrite phase shifters, PIN diode phase shifters, Micro-Electro-Mechanical System (MEMS) phase shifters, and liquid crystal phase shifters, and the like.

SUMMARY OF THE INVENTION

In one aspect, some embodiments of the present disclosure provide a liquid crystal phase shifter. The liquid crystal phase shifter includes a liquid crystal cell, a partition plate, a first microstrip line, a second microstrip line and liquid crystal molecules. The liquid crystal cell includes a first substrate and a second substrate disposed opposite to each other; the partition plate is disposed between the first substrate and the second substrate; the first microstrip line is disposed on a surface of the partition plate away from the second substrate; the second microstrip line is disposed on a surface of the partition plate away from the first substrate; and the liquid crystal molecules are provided between the first substrate and the partition plate, and between the second substrate and the partition plate.

In some embodiments, the partition plate is provided with at least one first through hole, and the first microstrip line is electrically connected to the second microstrip line through the at least one first through hole.

In some embodiments, a hole diameter of the at least one first through hole is less than or equal to a width of the first microstrip line. Alternatively, a hole diameter of the at least one first through hole is less than or equal to a width of the second microstrip line. The width of the first microstrip line is a width of an orthogonal projection of the first microstrip line on the partition plate, and the width the second microstrip line is a width of an orthogonal projection of the second microstrip line on the partition plate.

In some embodiments, a wiring path of the first microstrip line is the same as a wiring path of the second microstrip line.

In some embodiments, a width of the first microstrip line is the same as a width of the second microstrip line. The width of the first microstrip line is a width of an orthogonal projection of the first microstrip line on the partition plate, and the width the second microstrip line is a width of an orthogonal projection of the second microstrip line on the partition plate.

In some embodiments, an orthogonal projection of the first microstrip line on the partition plate overlaps or partially overlaps with an orthogonal projection of the second microstrip line on the partition plate.

In some embodiments, an input terminal of the first microstrip line is electrically connected to an input terminal of the second microstrip line, and/or an output terminal of the first microstrip line is electrically connected to an output terminal of the second microstrip line.

In some embodiments, the partition plate is provided with at least one second through hole, and a first liquid crystal cavity between the partition plate and the first substrate is communicated with a second liquid crystal cavity between the partition plate and the second substrate through the at least one second through hole.

In some embodiments, a thickness of the partition plate is less than a thickness of the first substrate, or a thickness of the partition plate is less than a thickness of the second substrate.

In some embodiments, the liquid crystal cell further includes ground electrodes respectively disposed on a surface of the first substrate facing to the partition plate and a surface of the second substrate facing to the partition plate.

In some embodiments, the liquid crystal phase shifter further includes a first alignment layer and a second alignment layer. The first alignment layer is disposed on a surface of the first microstrip line away from the partition plate, and the second alignment layer is disposed on a surface of the second microstrip line away from the partition plate.

In another aspect, some embodiments of the present disclosure provide an electronic device including any of the liquid crystal phase shifters described above.

In some embodiments, a distance between the partition plate and the first substrate is the same as a distance between the partition plate and the second substrate.

In some embodiments, the first microstrip line or the second microstrip line is provided on the partition plate along a curved line.

In some embodiments, the liquid crystal phase shifter further includes a first alignment layer and a second alignment layer. The first alignment layer is disposed on a surface of the ground electrode on the first substrate away from the first substrate, and the second alignment layer is disposed on a surface of the ground electrode on the second substrate away from the second substrate.

BRIEF DESCRIPTION OF THE DRAWINGS

In order to describe technical solutions in some embodiments of the present disclosure more clearly, the accompanying drawings to be used in the description of disclosure will be introduced briefly. Obviously, the accompanying drawings to be described below are merely some embodiments of the present disclosure.

DETAILED DESCRIPTION OF THE INVENTION

The technical solutions in some embodiments of the present disclosure will be described clearly and completely with reference to the accompanying drawings in some embodiments of the present disclosure. Obviously, the described embodiments are merely some but not all of embodiments of the present disclosure.

In some embodiments of the present disclosure, the term "a plurality of" or "the plurality of" means two or more unless otherwise specified. The term "and/or" is merely used to describe an association relationship of associated objects, which represents three kinds of relationships. For example, "A and/or B" represents three conditions: A exists alone, A and B exist simultaneously, and B exists alone. Terms "first" and "second" are used to distinguish between same or similar items whose functions and effects are substantially the same. A person skilled in the art would understand that the terms "first" and "second" are not intended to limit quantity and execution order, and do not limit a difference.

When microwaves propagate through a medium, a change in a dielectric constant of the medium will cause a change in phases of the microwaves. With regard to a liquid crystal phase shifter, by applying a bias voltage to control deflection angles (or arrangement directions) of liquid crystal molecules in a liquid crystal layer, a dielectric constant of the liquid crystal molecules in the liquid crystal layer may be changed, so that the phases of the microwaves are changed, thereby achieving the purpose of shifting the phase of the microwave. The dielectric constant of the liquid crystal molecules is continuously changed with a change of the bias voltage, thereby achieving an adjustment of continuous phase shift. However, the liquid crystal phase shifter in the related art is prone to a problem of a low utilization rate of an electric field during use. For example, in the liquid crystal phase shifter, a part of the electric field formed by using the bias voltage is in the liquid crystal layer, which may affect the arrangement directions of the liquid crystal molecules, and another part is outside the liquid crystal layer, which is difficult to be effectively utilized, thereby reducing the utilization rate of the electric field and affecting phase shifting capability of the liquid crystal phase shifter.

Figure 1:
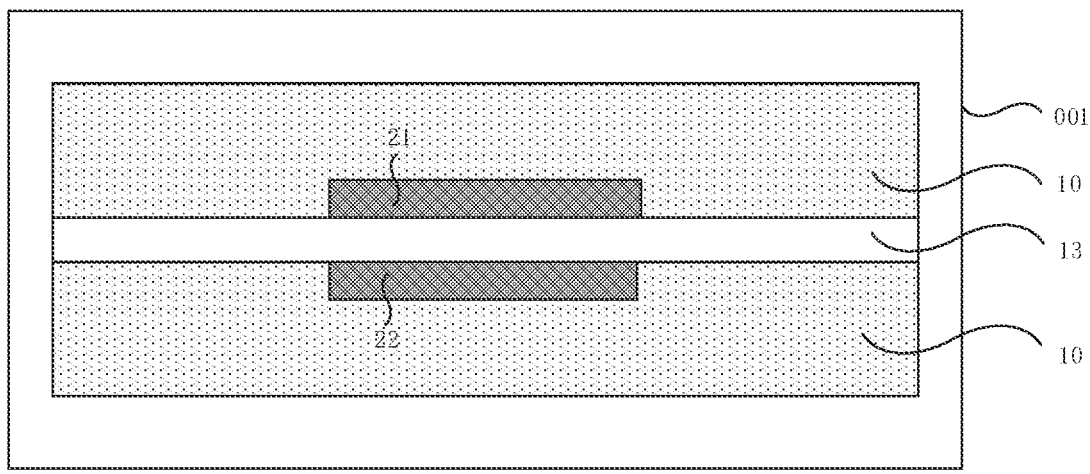
FIG. 1 is a schematic diagram showing a structure of a liquid crystal phase shifter, in accordance with some embodiments of the present disclosure.

Some embodiments of the present disclosure provide a liquid crystal phase shifter 01. As shown in FIG. 1, the liquid crystal phase shifter 01 includes a liquid crystal cell 001, a partition plate 13 disposed in the liquid crystal cell 001, a first microstrip line 21 and a second microstrip line 22 respectively disposed at both sides of the partition plate 13.

The liquid crystal cell 001 includes a first substrate 11 (FIG. 2) and a second substrate 12 (FIG. 2) disposed opposite to each other. The first substrate 11 is disposed at a side of the first microstrip line 21 away from the partition plate 13, and the second substrate 12 is disposed at a side of the second microstrip line 22 away from the partition plate 13. The partition plate 13 is disposed between the first substrate 11 and the second substrate 12, and divides space in the liquid crystal cell 001 into a first liquid crystal cavity 41 (FIG. 2) between the first substrate 11 and the partition plate 13, and a second liquid crystal cavity 42 (FIG. 2) between the second substrate 12 and the partition plate 13.

In a process of manufacturing the liquid crystal cell 001, space for accommodating liquid crystal layers 10 is formed between the first substrate 11 and the second substrate 12 in such a manner that the first substrate 11 and the second substrate 12 are paired with each other. Alternatively, the first liquid crystal cavity 41 and the second liquid crystal cavity 42 for accommodating the liquid crystal layers 10 are formed in such a manner that the first substrate 11 and the second substrate 12 are respectively paired with the partition plate 13.

For example, a liquid crystal layer 10 is formed at a side of the partition plate 13 where the first microstrip line 21 is disposed. Then, the first substrate 11 is paired with the partition plate 13 on which the first microstrip line 21 and the liquid crystal layer 10 are formed, and the first liquid crystal cavity 41 may be formed between the first substrate 11 and the partition plate 13. Next, the above formed structure is inverted, and a liquid crystal layer 10 is formed on a side of the partition plate 13 where the second microstrip line 22 is disposed. Then, the second substrate 12 is paired with the partition plate 13 on which the second microstrip line 22 and the liquid crystal layer 10 are formed, and the second liquid crystal cavity 42 may be formed between the second substrate 12 and the partition plate 13.

Here, a material of the first substrate 11, the second substrate 12 and the partition plate 13 includes an insulating material. For example, the first substrate 11, the second substrate 12 and the partition plate 13 described above are glass substrates, or transparent or non-transparent resin substrates, which is not limited in some embodiments of the present disclosure.

In some embodiments, as shown in FIGS. 2-7, the first substrate 11 and the second substrate 12 are parallel to each other. The partition plate 13 is disposed parallel to the first substrate 11. Alternatively, a plane where the partition plate 13 is located is at an angle to a plane where the first substrate 11 is located, which is not limited in some embodiments of the present disclosure.

Some embodiments of the present disclosure do not limit a distance between the partition plate 13 and the first substrate 11 and a distance between the partition plate 13 and the second substrate 12.

Optionally, as shown in FIGS. 2-7, the partition plate 13 is parallel to both the first substrate 11 and the second substrate 12, and the partition plate 13 is located between the first substrate 11 and the second substrate 12. The distance between the partition plate 13 and the first substrate 11 is the same as the distance between the partition plate 13 and the second substrate 12. In this case, a thickness of the liquid crystal layer 10 in the first liquid crystal cavity 41 is the same as a thickness of the liquid crystal layer 10 in the second liquid crystal cavity 42.

A person skilled in the art may set the thickness of the liquid crystal layer 10 in the first liquid crystal cavity 41 or the second liquid crystal cavity 42 as needed. Optionally, the thickness of the liquid crystal layer 10 in each liquid crystal cavity is less than or equal to 300 μm. For example, the thickness of the liquid crystal layer 10 in each liquid crystal cavity is 100 μm to reduce the thickness of the entire liquid crystal phase shifter 01, which is advantageous for achieving a thin thickness of the liquid crystal phase shifter 01.

Some embodiments of the present disclosure do not limit a thickness of the first substrate 11, a thickness of the second substrate 12 and a thickness of the partition plate 13. Optionally, the thickness of the partition plate 13 is less than the thickness of the first substrate 11, or the thickness of the partition plate 13 is less than the thickness of the second substrate 12, to reduce the thickness of the entire liquid crystal phase shifter 01, which is advantageous for achieving thinning of the liquid crystal phase shifter 01.

Figure 9:
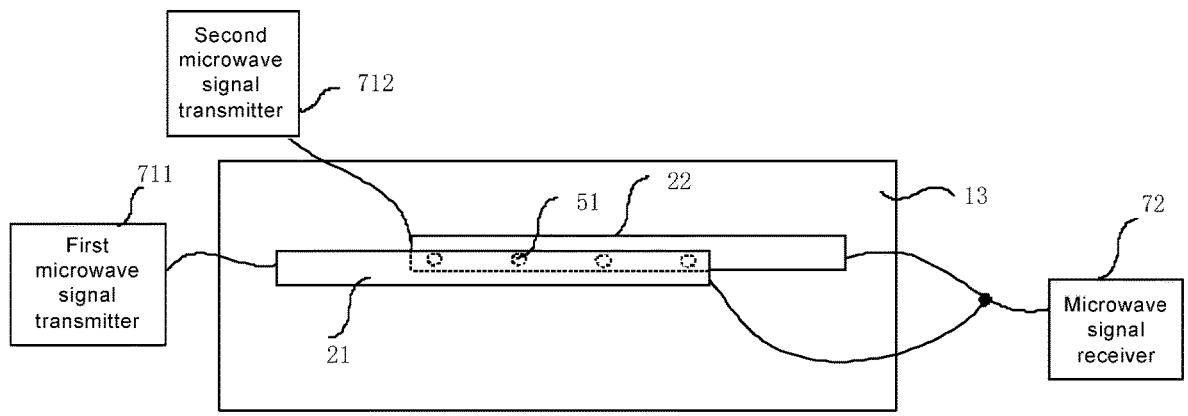
FIG. 9 is a schematic diagram showing another arrangement of a first microstrip line and a second microstrip line, in accordance with some embodiments of the present disclosure.
Figure 10:
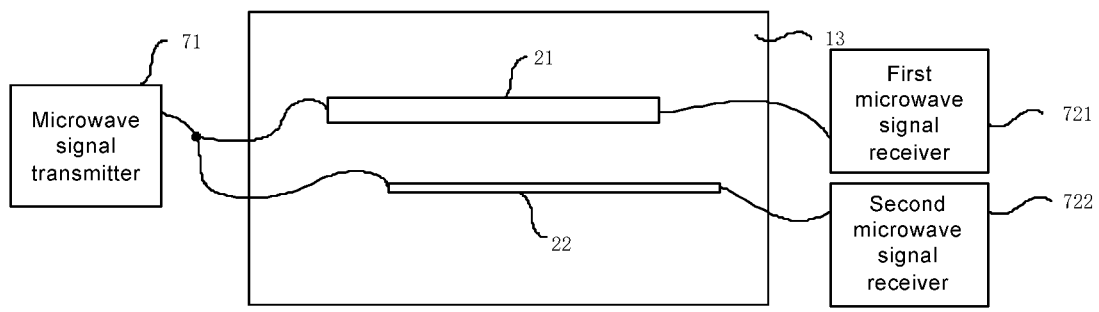
FIG. 10 is a schematic diagram showing yet another arrangement of a first microstrip line and a second microstrip line, in accordance with some embodiments of the present disclosure.

The first microstrip line 21 and the second microstrip line 22 are configured to transmit microwave signals. As shown in FIGS. 9-10, an input terminal of the first microstrip line 21 and an input terminal of the second microstrip line 22 are respectively coupled to corresponding microwave signal transmitters. An output terminal of the first microstrip line 21 and an output terminal of the second microstrip line 22 are respectively coupled to corresponding microwave signal receivers.

In some embodiments, the first microstrip line 21 and the second microstrip line 22 are made of metal. For example, the first microstrip line 21 and the second microstrip line 22 are made of copper, aluminum, gold, silver or alloys thereof, or other suitable conductive materials. In a process of manufacturing the first microstrip line 21 and the second microstrip line 22, the partition plate 13 is used as a substrate, and as shown in FIG. 1, the first microstrip line 21 and the second microstrip line 22 are respectively formed on both sides of the partition plate 13 through a process such as a magnetron sputtering process, and an etching process.

Figure 8:
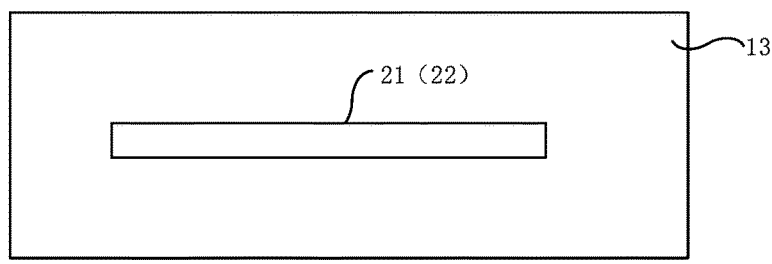
FIG. 8 is a schematic diagram showing an arrangement of a first microstrip line and a second microstrip line, in accordance with some embodiments of the present disclosure.
Figure 11:
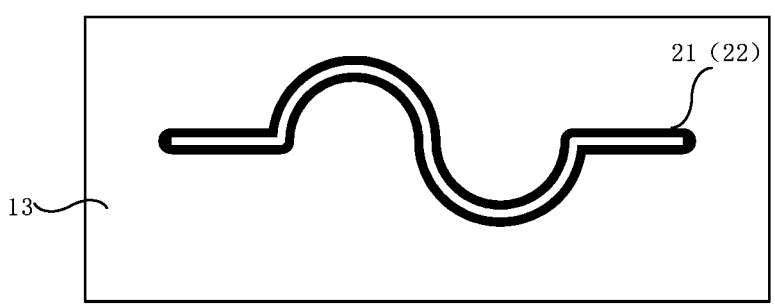
FIG. 11 is a schematic diagram showing yet another arrangement of a first microstrip line and a second microstrip line, in accordance with some embodiments of the present disclosure.
Figure 12:
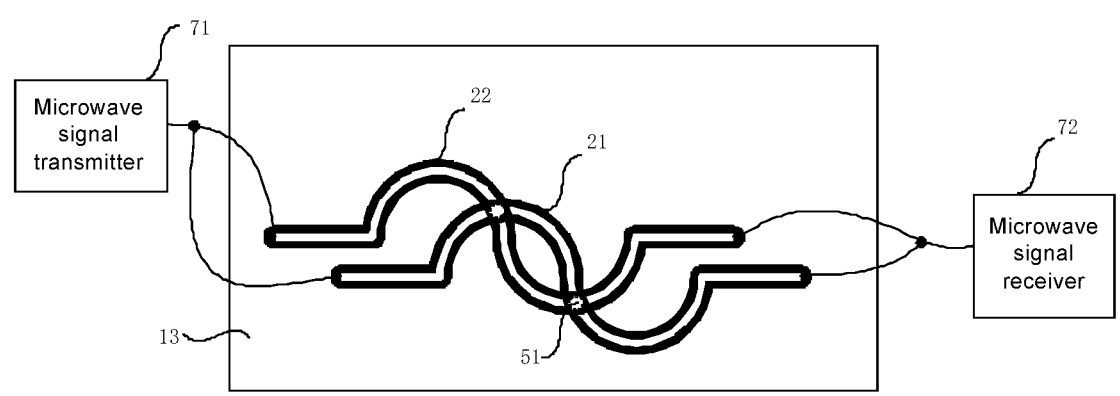
FIG. 12 is a schematic diagram showing yet another arrangement of a first microstrip line and a second microstrip line, in accordance with some embodiments of the present disclosure.

In some embodiments, the first microstrip line 21 and the second microstrip line 22 may be arranged in a plurality of ways, and may be provided along any line such as a straight line, a broken line, or a curved line. For example, as shown in FIGS. 8-10, the first microstrip line 21 or the second microstrip line 22 is disposed on the partition plate 13 along a straight line. The straight line is simple in structure and easy to process. For another example, as shown in FIG. 11 or FIG. 12, the first microstrip line 21 or the second microstrip line 22 is disposed on the partition plate 13 along a curved line, thereby shortening a length of the liquid crystal phase shifter in an extending direction of the microstrip line, which is advantageous for reducing a size of the liquid crystal phase shifter and achieving miniaturization of the liquid crystal phase shifter. Of course, the first microstrip line 21 and the second microstrip line 22 may be wired in the same shape, or may be wired in different shapes.

Figure 2:
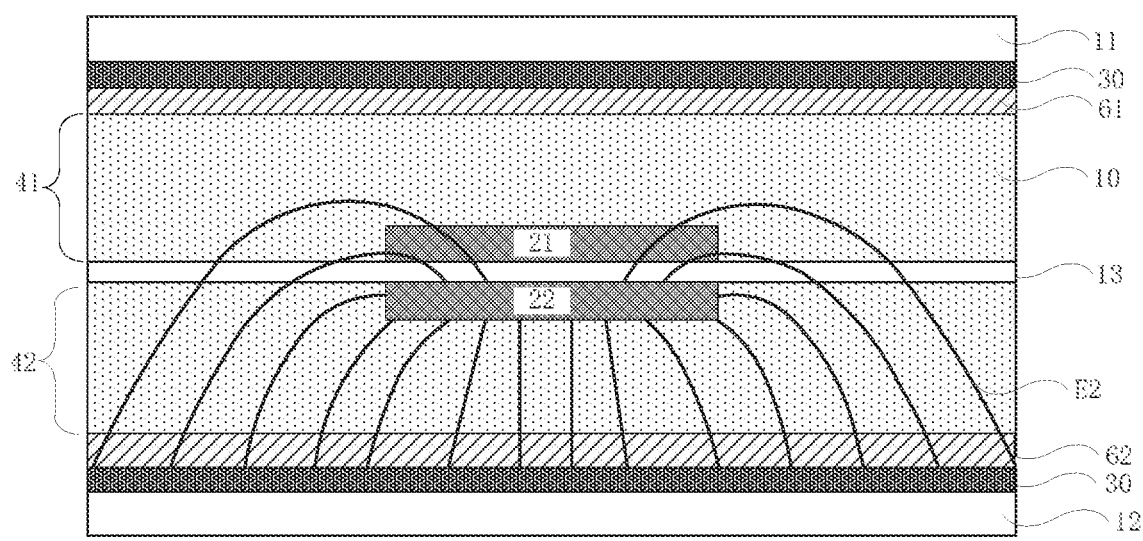
FIG. 2 is a schematic diagram showing an electric field in a liquid crystal phase shifter, in accordance with some embodiments of the present disclosure.

In the liquid crystal phase shifter in some embodiments of the present disclosure, considering an example in which the microwave signal is input to the second microstrip line 22, referring to FIG. 2, a part of the second electric field E2 is in the second liquid crystal cavity 42 to change the deflection angles of the liquid crystal molecules in the second liquid crystal cavity 42 and another part of the second electric field E2 is in the first liquid crystal cavity 41 (i.e., as shown in FIG. 2, the electric field lines pass through the partition plate 13 and enter the first liquid crystal cavity 41), so that liquid crystal molecules in the liquid crystal layer 10 in the first liquid crystal cavity 41 are deflected due to the action of the second electric field E2, thereby affecting a phase of the microwave signal in the second microstrip line 22, further facilitating increasing the phase shifting degree of the phase of the microwave signal, improving utilization rate of the electric field, and solving a problem that a loss is caused due to the fact that the electric field outside the second liquid crystal cavity 42 is not utilized.

In some embodiments, by applying a bias voltage to the liquid crystal phase shifter, an electric field capable of causing the liquid crystal molecules to be deflected may be formed, and there are a plurality of ways of forming the electric field. For example, electrodes are provided in the liquid crystal cell 001 (FIG. 1), and an electric field is formed between an electrode and a corresponding microstrip line by respectively applying voltages to the electrode and the microstrip line.

Figure 3:
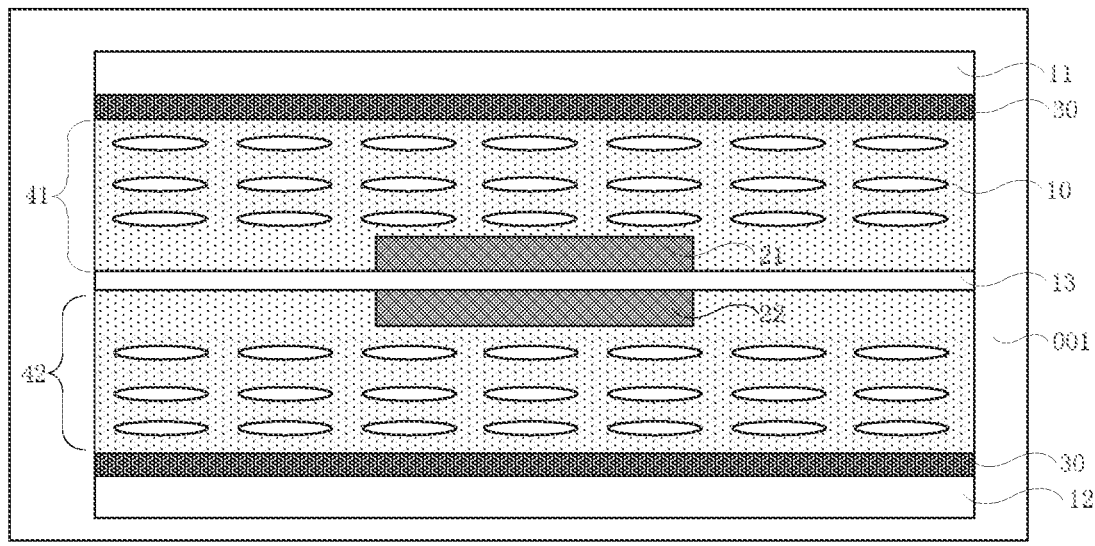
FIG. 3 is a schematic diagram showing a structure of another liquid crystal phase shifter, in accordance with some embodiments of the present disclosure.

For example, as shown in FIG. 3, the liquid crystal cell 001 (FIG. 1) further includes ground electrodes 30 respectively disposed at a side of the first substrate 11 facing to the partition plate 13 and a side of the second substrate 12 facing to the partition plate 13. Optionally, the ground electrode 30 disposed at the side of the first substrate 11 facing to the partition plate 13 is an entire metal conductive layer covering a surface of the first substrate 11. The ground electrode 30 disposed at the side of the second substrate 12 facing to the partition plate 13 is an entire metal conductive layer covering a surface of the second substrate 12. However, some embodiments of the present disclosure are not limited thereto. It is also permissible that the ground electrode 30 disposed at the side of the first substrate 11 facing to the partition plate 13 covers a part of the surface of the first substrate 11, and/or the ground electrode 30 disposed at the side of the second substrate 12 facing to the partition plate 13 covers a part of the surface of the second substrate 12.

Optionally, the ground electrodes 30 are respectively formed on a surface of the first substrate 11 facing to the partition plate 13 and a surface of the second substrate 12 facing to the partition plate 13 through the sputtering process.

In some embodiments, as shown in FIG. 2, the liquid crystal phase shifter further includes a first alignment layer 61 and a second alignment layer 62, and the first alignment layer 61 and the second alignment layer 62 are used to define the initial deflection angles (the initial alignments) of the liquid crystal molecules. The first alignment layer 61 is disposed at a side of the first microstrip line 21 away from the partition plate 13, and the second alignment layer 62 is disposed at a side of the second microstrip line 22 away from the partition plate 13.

For example, as shown in FIG. 2, the first alignment layer 61 is disposed on a surface of the ground electrode 30 on the first substrate 11 facing away from the first substrate 11 to define the initial deflection angles of the liquid crystal molecules in the first liquid crystal cavity 41. The second alignment layer 62 is disposed on a surface of the ground electrode 30 on the second substrate 12 facing away from the second substrate 12 to define the initial deflection angles of the liquid crystal molecules in the liquid crystal layer 10 in the second liquid crystal cavity 42.

Figure 5:
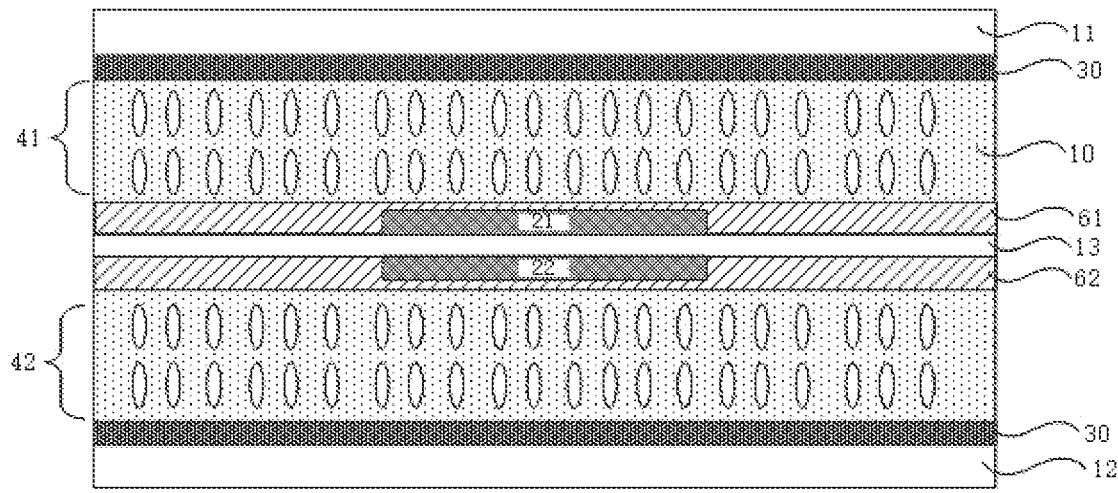
FIG. 5 is a schematic diagram showing a structure of yet another liquid crystal phase shifter, in accordance with some embodiments of the present disclosure.

For example, as shown in FIG. 5, the liquid crystal phase shifter 01 further includes ground electrodes 30 respectively disposed at a side of the first substrate 11 facing to the partition plate 13 and a side of the second substrate 12 facing to the partition plate 13. The first alignment layer 61 is disposed on a surface of the first microstrip line 21 away from the partition plate 13, and the second alignment layer 62 is disposed on a surface of the second microstrip line 22 away from the partition plate 13. Therefore, the initial deflection angles of the liquid crystal molecules in the first liquid crystal cavity 41 and the initial deflection angles of the liquid crystal molecules in the second liquid crystal cavity 42 are respectively defined through the first alignment layer 61 and the second alignment layer 62.

Figure 4:
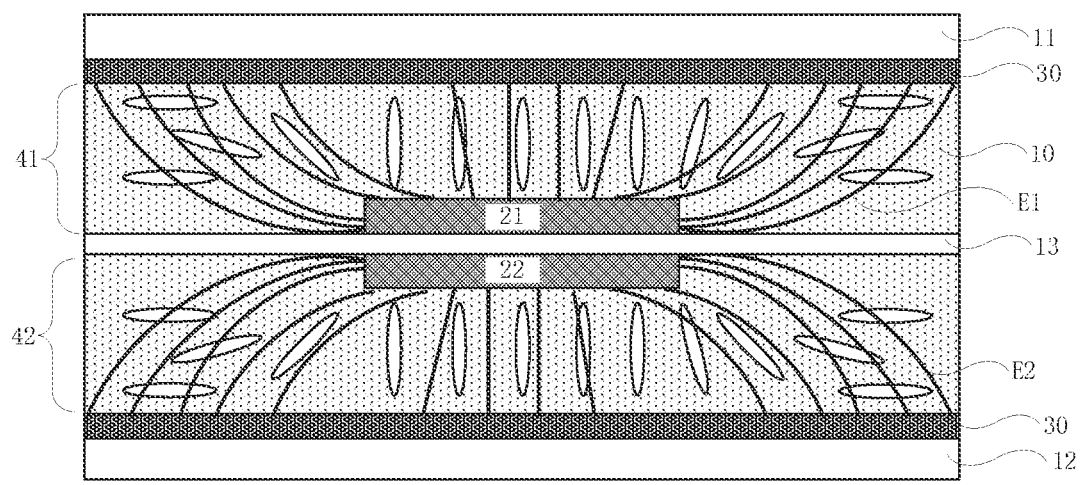
FIG. 4 is a schematic diagram showing electric fields in a first liquid crystal cavity and a second liquid crystal cavity in the liquid crystal phase shifter shown in FIG. 3.

The liquid crystal molecules in the liquid crystal cell 001 (FIG. 1) may have various initial alignments. For example, as shown in FIG. 3, in an initial state (in a case where a voltage is not applied to the liquid crystal phase shifter 01), the liquid crystal molecules are in a horizontal state (Alternatively, in the initial state, as shown in FIG. 5, the liquid crystal molecules are in a vertical state). When voltages are applied to the ground electrodes 30 and the microstrip lines 21 and 22, and the microwave signals are input via the input terminal of the first microstrip line 21 and the input terminal of the second microstrip line 22, as shown in FIG. 4, a first electric field E1 is generated between the first microstrip line 21 and the ground electrode 30 on the first substrate 11, and a second electric field E2 is generated between the second microstrip line 22 and the ground electrode 30 on the second substrate 12. Due to the action of the first electric field E1, most of the liquid crystal molecules in the first liquid crystal cavity 41 are deflected from an initial horizontal state (as shown in FIG. 3) to a vertical state (as shown in FIG. 4). In addition, most of the liquid crystal molecules in the second liquid crystal cavity 42 are also deflected from an initial horizontal state (as shown in FIG. 3) to a vertical state (as shown in FIG. 4) due to the action of the second electric field E2.

In the initial state, the liquid crystal molecules in the liquid crystal layer 10 in the first liquid crystal cavity 41 and the liquid crystal molecules in the liquid crystal layer 10 in the second liquid crystal cavity 42 are in the horizontal state as shown in FIG. 3. In this case, a dielectric constant of the liquid crystal molecules in the liquid crystal layers 10 is $\varepsilon_{r1}$. When the voltages are applied to the ground electrodes 30 and the microstrip lines 21 and 22, and the microwave signals are input to the first microstrip line 21 and the second microstrip line 22, since the liquid crystal molecules in the liquid crystal layer 10 in the first liquid crystal cavity 41 and the liquid crystal molecules in the liquid crystal layer 10 in the second liquid crystal cavity 42 are deflected due to the action of the first electric field E1 and the second electric field E2 as shown in FIG. 4, a dielectric constant of the liquid crystal molecules in the first liquid crystal cavity 41 and the second liquid crystal cavity 42 is $\varepsilon_{r2}$.

Usually, Erg is less than $\varepsilon_{r1}$. Further, a phase shifting degree of the liquid crystal phase shifter 01 is directly proportional to a difference between sqrt ($\varepsilon_{r2}$) and sqrt ($\varepsilon_{r1}$). Therefore, in a case where there is a difference between $\varepsilon_{r1}$ and $\varepsilon_{r2}$, the difference may change the phase of the microwave signal input to the first microstrip line 21 and the phase of the microwave signal input to the second microstrip line 22, thereby achieving a purpose of adjusting the phase of the microwave signal.

It will be noted that a difference value between a phase of a microwave signal before the microwave signal enters a microstrip line and a phase of the microwave signal after the microwave signal is output from the microstrip line is the phase shifting degree.

Figure 14:
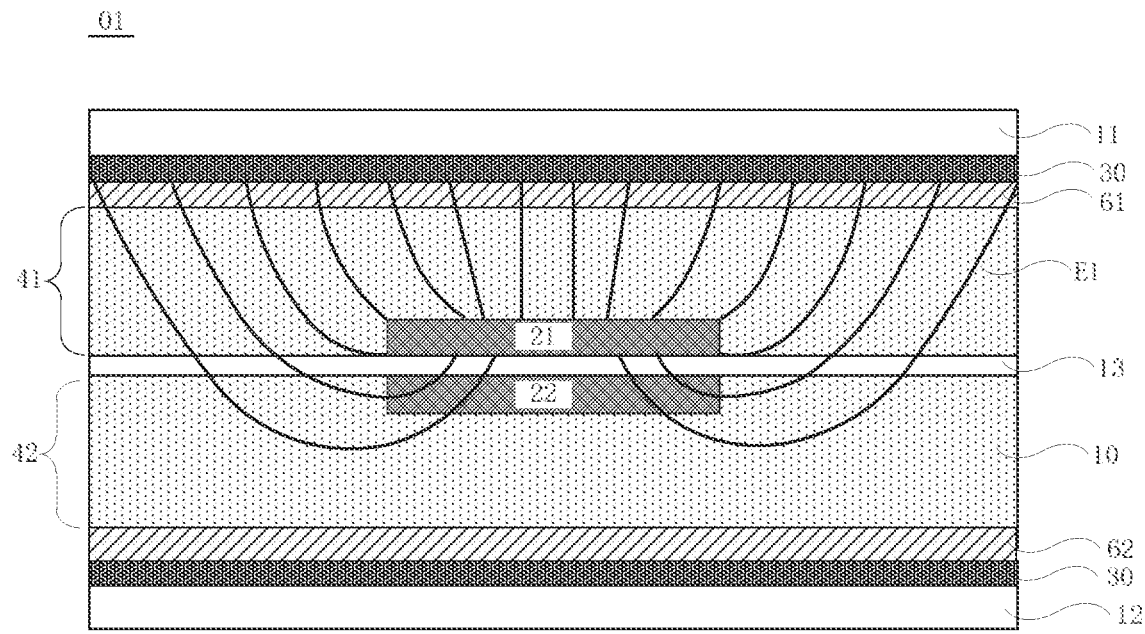
FIG. 14 is a schematic diagram showing an electric field in a liquid crystal phase shifter, in accordance with some embodiments of the present disclosure.
Figure 15:
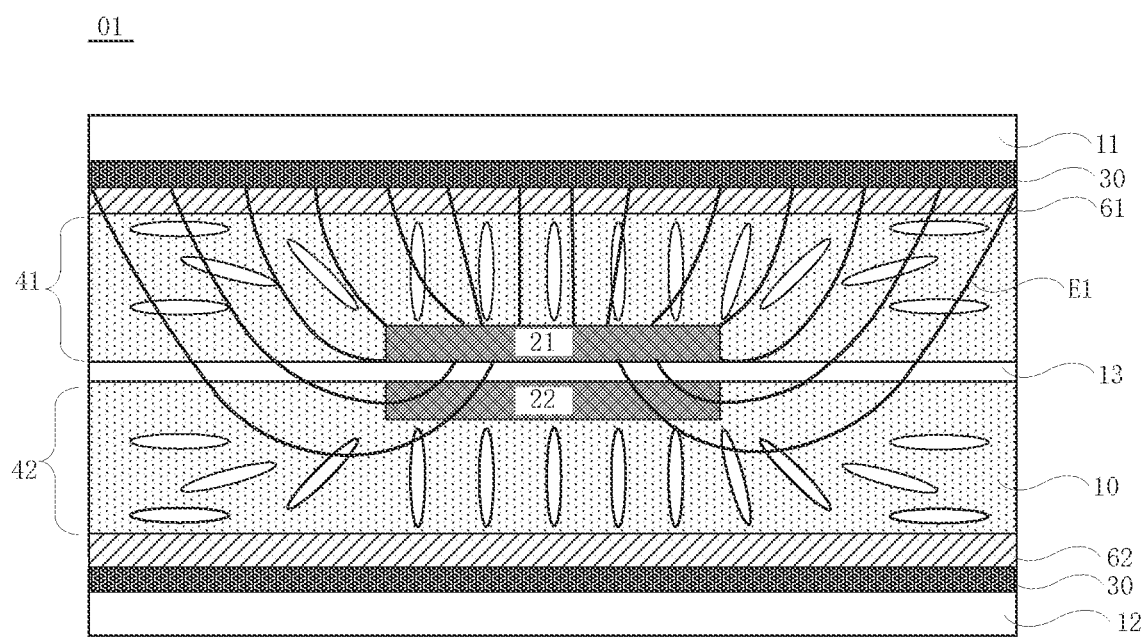
FIG. 15 is a schematic diagram showing an electric field in a first liquid crystal cavity in the liquid crystal phase shifter.

In some embodiments of the present disclosure, as shown in FIG. 14 and FIG. 15, by disposing the first microstrip line 21 and the second microstrip line 22 on both sides of the partition plate 13 respectively, the first microstrip line 21 is located in the first liquid crystal cavity 41 between the partition plate 13 and the first substrate 11, and the second microstrip line 22 is located in the second liquid crystal cavity 42 between the partition plate 13 and the second substrate 12. The liquid crystal layers 10 are accommodated in the first liquid crystal cavity 41 and the second liquid crystal cavity 42. In this case, as shown in FIG. 14, the liquid crystal phase shifter 01 further includes a first alignment layer 61 and a second alignment layer 62. The first alignment layer 61 is disposed at a side of the first microstrip line 21 away from the partition plate 13, and the second alignment layer 62 is disposed at a side of the second microstrip line 22 away from the partition plate 13. When the microwave signal is input to the first microstrip line 21 and a voltage is applied to the ground electrode 30 provided at a side of the first microstrip line 21 facing to the first substrate 11, the first electric field E1 is generated between the first microstrip line 21 and the ground electrode 30. In this case, as shown in FIG. 15, the liquid crystal phase shifter 01 further includes ground electrodes 30 respectively disposed at the side of the first substrate 11 facing to the partition plate 13 and the side of the second substrate 12 facing to the partition plate 13. The liquid crystal phase shifter 01 further includes a first alignment layer 61 and a second alignment layer 62. The first alignment layer 61 is disposed at a side of the first microstrip line 21 away from the partition plate 13, and the second alignment layer 62 is disposed at a side of the second microstrip line 22 away from the partition plate 13. A part of the first electric field E1 is in the first liquid crystal cavity 41 to deflect the liquid crystal molecules in the first liquid crystal cavity 41. Another part of the first electric field E1 is in the second liquid crystal cavity 42 (the electric field lines pass through the partition plate 13 and enter the second liquid crystal cavity 42), so that the liquid crystal molecules in the liquid crystal layer 10 in the second liquid crystal cavity 42 are deflected due to the action of the first electric field E1. Since the first electric field E1 has a larger effective range and a higher utilization rate, the influence on the phase of the microwave signal in the first microstrip line 21 is increased, thereby facilitating increasing the phase shifting degree of the phase of the microwave signal, and solving a problem that a loss is caused due to the fact that the electric field outside the first liquid crystal cavity 41 is not utilized.

Similarly, when the microwave signal is input to the second microstrip line 22, and a voltage is applied to the ground electrode 30 provided at a side of the second microstrip line 22 facing to the second substrate 12 and the second microstrip line 22, the second electric field E2 is generated between the second microstrip line 22 and the ground electrode 30. The electric field lines are used to indicate the distribution of the electric field. In this case, a part of electric field lines of the second electric field E2 is in the second liquid crystal cavity 42 to deflect the liquid crystal molecules in the second liquid crystal cavity 42. Another part of electric field lines of the second electric field E2 is in the first liquid crystal cavity 41 (the electric field lines pass through the partition plate 13 and enter the first liquid crystal cavity 41), so that the liquid crystal molecules in the liquid crystal layer 10 in the first liquid crystal cavity 41 are deflected due to the action of the second electric field E2. Since the second electric field E2 has a larger effective range and a higher utilization rate, the influence on the phase of the microwave signal in the second microstrip line 22 is increased, thereby facilitating increasing the phase shifting degree of the phase of the microwave signal, and solving the problem that a loss is caused due to the fact that the electric field outside the second liquid crystal cavity 42 is not utilized.

In addition, when the microwave signals are respectively input to the first microstrip line 21 and the second microstrip line 22, and the voltages are applied to the ground electrodes and the microstrip lines, as shown in FIG. 4, the first electric field E1 and the second electric field E2 are generated in the liquid crystal phase shifter 01, and the liquid crystal molecules in an upper liquid crystal layer 10 and a lower liquid crystal layer 10 separated by the partition plate 13 may affect the phases of the microwave signals in the first microstrip line 21 and the second microstrip line 22, thereby increasing the phase shifting degree of the microwave signals and reducing energy losses of the electric fields.

It will be noted that, the forgoing embodiments are described by taking an example in which in the initial state, the liquid crystal molecules in the liquid crystal layers 10 are all in the horizontal state as shown in FIG. 3, and when the microwave signals are input to the first microstrip line 21 and the second microstrip line 22, most of the liquid crystal molecules are deflected to the vertical state due to the action of the electric fields as shown in FIG. 4.

Figure 6:
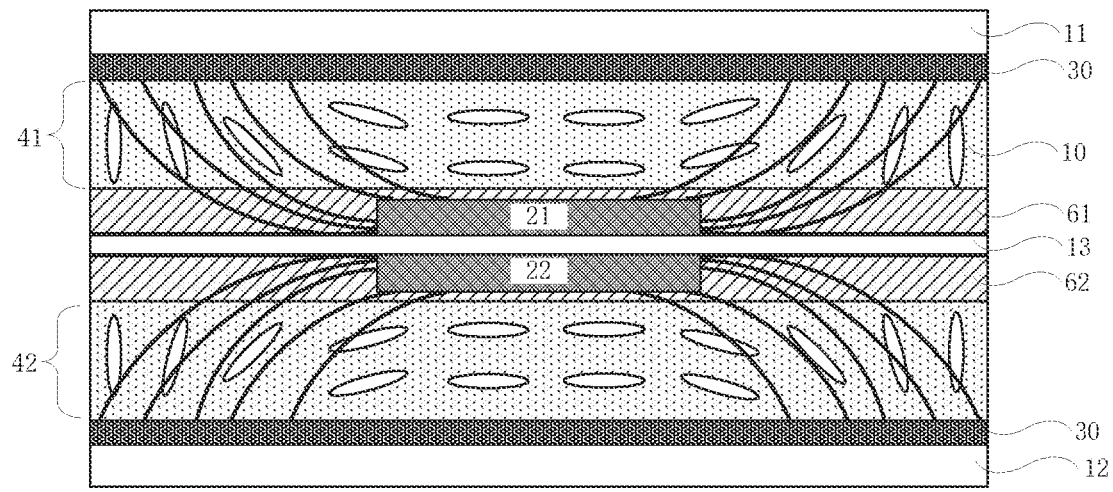
FIG. 6 is a schematic diagram showing electric fields in a first liquid crystal cavity and a second liquid crystal cavity in the liquid crystal phase shifter shown in FIG. 5.
Figure 16:
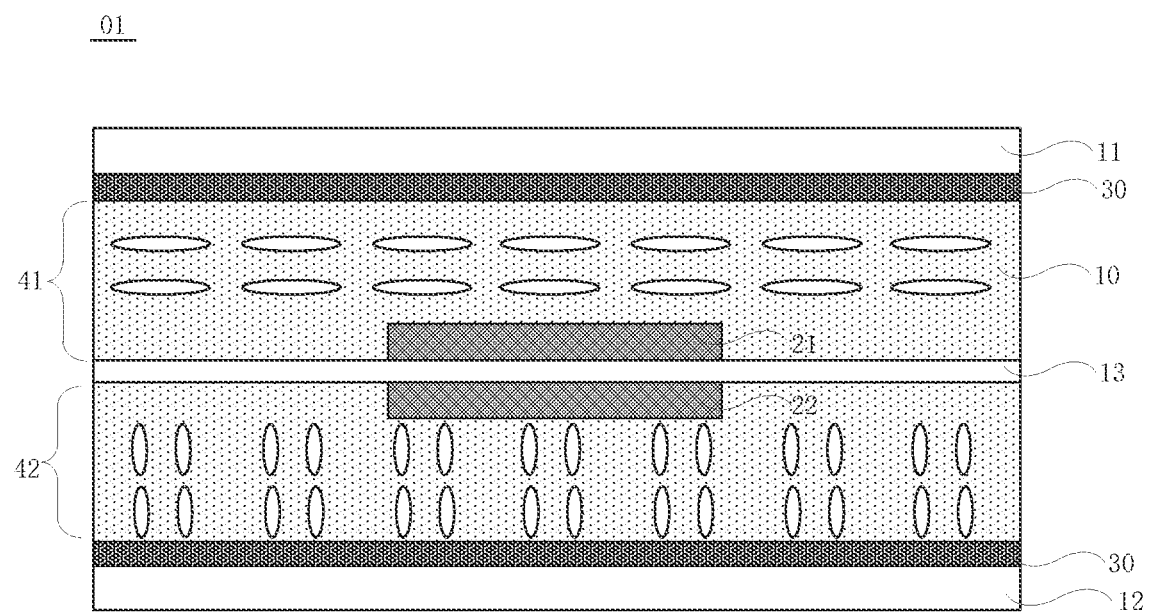
FIG. 16 is a schematic diagram showing a structure of a liquid crystal phase shifter, in accordance with some embodiments of the present disclosure.

The liquid crystal molecules in the liquid crystal cell 001 may also have various initial alignments. For example, in the initial state, as shown in FIG. 5, the liquid crystal molecules in the liquid crystal layers 10 are in the vertical state. As shown in FIG. 6, the liquid crystal phase shifter 01 further includes ground electrodes 30 respectively disposed at the side of the first substrate 11 facing to the partition plate 13 and the side of the second substrate 12 facing to the partition plate 13. The liquid crystal phase shifter further includes a first alignment layer 61 and a second alignment layer 62. The first alignment layer 61 is disposed on a surface of the first microstrip line 21 away from the partition plate 13, and the second alignment layer 62 is disposed on a surface of the second microstrip line 22 away from the partition plate 13. When the microwave signals are input to the first microstrip line 21 and the second microstrip line 22, the liquid crystal molecules are deflected to the horizontal state due to the action of the electric fields. Alternatively, as shown in FIG. 16, the liquid crystal phase shifter 01 includes a partition plate 13, a first microstrip line 21 and a second microstrip line 22 respectively disposed at both sides of the partition plate 13. The liquid crystal phase shifter 01 further includes ground electrodes 30 respectively disposed at the side of the first substrate 11 facing to the partition plate 13 and the side of the second substrate 12 facing to the partition plate 13. The initial state of the liquid crystal molecules in the liquid crystal layer 10 in the first liquid crystal cavity 41 is different from the initial state of the liquid crystal molecules in the liquid crystal layer 10 in the second liquid crystal cavity 42.

The initial deflection angles of the liquid crystal molecules are not limited in the present disclosure, as long as the deflection angles of the liquid crystal molecules in the liquid crystal layer in the first liquid crystal cavity 41 or the second liquid crystal cavity 42 are changed before and after the electric fields in the liquid crystal phase shifter 01 are generated, so that the change of the dielectric constant of the liquid crystal molecules may be ensured.

In some embodiments, the microwave signals input to the first microstrip line 21 are the same as or different from the microwave signals input to the second microstrip line 22.

For example, as shown in FIG. 10 and FIG. 12, in a case where the microwave signals output from the first microstrip line 21 are the same as the microwave signals output from the second microstrip line 22, the input terminal of the first microstrip line 21 is electrically connected to the input terminal of the second microstrip line 22, so that the electrically connected input terminals of the two microstrip lines 21 and 22 may be coupled to the same microwave signal transmitter 71. In this case, the output terminal of the first microstrip line 21 and the output terminal of the second microstrip line 22 are coupled to the same microwave signal receiver 72 (FIG. 9 and FIG. 12) or different microwave signal receivers (for example, as shown in FIG. 10, the output terminal of the first microstrip line 21 is coupled to a first microwave signal receiver 721, and the output terminal of the second microstrip line 22 is coupled to a second microwave signal receiver 722).

For another example, as shown in FIG. 9, the output terminal of the first microstrip line 21 is electrically connected to the output terminal of the second microstrip line 22, so that the electrically connected output terminals of the two microstrip lines 21 and 22 may be coupled to the same microwave signal receiver 72. In this case, the input terminal of the first microstrip line 21 and the input terminal of the second microstrip line 22 may be coupled to the same microwave signal transmitter 71 (FIG. 10), or different microwave signal transmitters (for example, as shown in FIG. 9, the input terminal of the first microstrip line 21 is coupled to a first microwave signal transmitter 711, and the input terminal of the second microstrip line 22 is coupled to a second microwave signal transmitter 712).

Of course, as shown in FIG. 12, the input terminal of the first microstrip line 21 is electrically connected to the input terminal of the second microstrip line 22, and the output terminal of the first microstrip line 21 may be electrically connected to the output terminal of the second microstrip line 22.

As a result, in a case where the microwave signal input to the first microstrip line 21 is the same as the microwave signal input to the second microstrip line 22, the number of input/output (I/O) interfaces (which are coupled to the input terminals of the microstrip lines 21 and 22) on the microwave signal transmitters may be reduced. Similarly, in the case where the microwave signal output from the first microstrip line 21 is the same as the microwave signal output from the second microstrip line 22, the number of the I/O interfaces (which are coupled to the output terminals of the microstrip lines 21 and 22) on the microwave signal receivers may be reduced.

In some embodiments, as shown in FIG. 9, the width of the first microstrip line 21 is the same as the width of the second microstrip line 22. As a result, the impedance of the first microstrip line 21 may match the impedance of the second microstrip line 22, thereby avoiding increased loss due to mismatch of the impedances of the first microstrip line 21 and the second microstrip line 22 at a position where the width of the first microstrip line 21 and the width of the second microstrip line 22 are different.

In some embodiments, a wiring path of the first microstrip line 21 is the same as or different from a wiring path of the second microstrip line 22. Here, the description that a wiring path of the first microstrip line 21 is the same as a wiring path of the second microstrip line 22 means that, for example, as shown in FIGS. 8-10, the first microstrip line 21 is disposed along a straight line, and the second microstrip line 22 is also disposed along the same straight line. Alternatively, as shown in FIGS. 11-12, the first microstrip line 21 is disposed along a curved line, the second microstrip line 22 is also disposed along the same curved line.

In some embodiments, as shown in FIGS. 9 and 12, the wiring path of the first microstrip line 21 is the same as the wiring path of the second microstrip line 22, and the width of the first microstrip line 21 is also the same as the width of the second microstrip line 22. In this case, the first microstrip line 21 and the second microstrip line 22 may be manufactured by using the same mask, thereby simplifying manufacturing processes.

Figure 7:
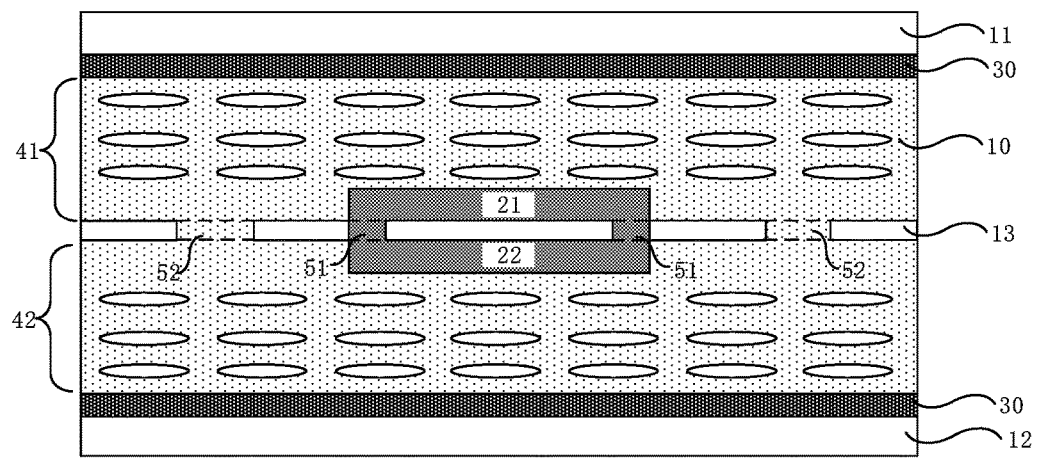
FIG. 7 is a schematic diagram showing a structure of yet another liquid crystal phase shifter, in accordance with some embodiments of the present disclosure.

In some embodiments, as shown in FIG. 7, the liquid crystal phase shifter 01 further includes ground electrodes 30 respectively disposed at a side of the first substrate 11 facing to the partition plate 13 and a side of the second substrate 12 facing to the partition plate 13. In some embodiments, as shown in FIG. 7, FIG. 9 or FIG. 12, the partition plate 13 is provided with at least one first through hole 51, and the first microstrip line 21 is electrically connected to the second microstrip line 22 through the at least one first through hole 51. In the case where the microwave signals output from the first microstrip line 21 and the second microstrip line 22 are the same, the first microstrip line 21 is electrically connected to the second microstrip line 22 through the at least one first through hole 51, which may increase the cross-sectional area of the microstrip lines 21 and 22, thereby reducing the impedances of the first microstrip line 21 and the second microstrip line 22.

Optionally, a hole diameter of the first through hole 51 is less than or equal to the width of the first microstrip line 21, or the hole diameter of the first through hole 51 is less than or equal to the width of the second microstrip line 22, so that the first microstrip line 21 is better electrically connected to the second microstrip line 22 through the first through hole 51. Here, the width of the line is a width of an orthogonal projection of a corresponding microstrip line on the partition plate 13.

In some embodiments, as shown in FIG. 8, 9, 11 or 12, an orthogonal projection of the first microstrip line 21 on the partition plate 13 overlaps or partially overlaps with an orthogonal projection of the second microstrip line 22 on the partition plate 13. As a result, as long as at least one first through hole 51 perpendicular to the plane where the partition plate 13 is located is formed in the partition plate 13 at a position where the orthogonal projection of the first microstrip line 21 on the partition plate 13 overlaps with the orthogonal projection of the second microstrip line 22 on the partition plate 13, the first microstrip line 21 and the second microstrip line 22 formed on both sides of the partition plate 13 are electrically connected to each other through the at least one first through hole 51, and thus the manufacturing process is simple and efficient.

In addition, when the microwave signal is input to the first microstrip line 21 or the second microstrip line 22, and the voltages are applied to the ground electrodes 30 and the corresponding microstrip lines, the first electric field E1 is generated between the first microstrip line 21 and a corresponding ground electrode 30, and the second electric field E2 is generated between the microstrip line 22 and a corresponding ground electrode 30. The liquid crystal molecules in the liquid crystal layers 10 are deflected under driving of the first electric field E1 or the second electric field E2. Therefore, when the orthogonal projection of the first microstrip line 21 on the partition plate 13 overlaps with the orthogonal projection of the second microstrip line on the partition plate 13, the first microstrip line 21 is directly opposite to the second microstrip line 22 in a direction perpendicular to the plane where the partition plate 13 is located, so that the deflection of the liquid crystal molecules adjacent to the first microstrip line 21 and the second microstrip line 22 is to a great degree. For example, these liquid crystal molecules are completely deflected from the initial horizontal state (as shown in FIG. 3) to the vertical state (as shown in FIG. 4), thereby greatly increasing the phase shifting degree of the liquid crystal phase shifter 01.

In some embodiments, as shown in FIG. 7, the partition plate 13 is provided with at least one second through hole 52, and the first liquid crystal cavity 41 is communicated with the second liquid crystal cavity 42 through the at least one second through hole 52.

Since the liquid crystal molecules in the liquid crystal layers 10 are flowable, the liquid crystal molecules in the liquid crystal layers 10 will flow with a movement of the liquid crystal phase shifter 01 during use of the liquid crystal phase shifter 01. Providing at least one second through hole 52 in the partition plate 13 may allow the liquid crystal molecules in the first liquid crystal cavity 41 to flow into the second liquid crystal cavity 42. Accordingly, the liquid crystal molecules in the second liquid crystal cavity 42 may also flow into the first liquid crystal cavity 41. As a result, the amount of the liquid crystal molecules in the liquid crystal layers 10 at both sides of the partition plate 13 may be balanced, thereby avoiding a phenomenon that the liquid crystal molecules gather at a certain place and the gathered liquid crystal molecules cause the liquid crystal cell 001 (i.e. FIG. 1) to bulge, and improving a stability of the liquid crystal phase shifter 01.

Figure 13:
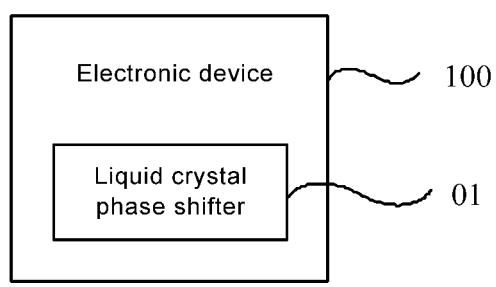
FIG. 13 is a schematic diagram showing a structure of an electronic device, in accordance with some embodiments of the present disclosure.

As shown in FIG. 13, some embodiments of the present disclosure provide an electronic device 100 including the liquid crystal phase shifter 01 in any of the above embodiments. The electronic device 100 is, for example, a mobile communication device such as a mobile phone or a tablet computer, or an electronic device capable of receiving, transmitting, or processing microwave signals, such as radar, or a satellite communication device. The electronic device 100 described above has the same technical effects as the liquid crystal phase shifter 01 provided by the foregoing embodiments, and details are not described herein again.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

The reference labels in the drawings are described as follows.

01 liquid crystal phase shifter
10 liquid crystal layer
11 first substrate
12 second substrate
13 partition plate
30 ground electrode
41 first liquid crystal cavity
42 second liquid crystal cavity
51 first through hole
52 second through hole
61 first alignment layer
62 second alignment layer
71 microwave signal transmitter
72 microwave signal receiver
711 first microwave signal transmitter
712 second microwave signal transmitter
721 first microwave signal receiver
722 second microwave signal receiver
100 electronic device

What is claimed is:

1. A liquid crystal phase shifter, comprising:
a liquid crystal cell including a first substrate and a second substrate disposed opposite to each other;
a partition plate disposed between the first substrate and the second substrate;
a first microstrip line disposed on a surface of the partition plate away from the second substrate;
a second microstrip line disposed on a surface of the partition plate away from the first substrate; and
liquid crystal molecules provided between the first substrate and the partition plate, and between the second substrate and the partition plate;
wherein a thickness of the partition plate is less than a thickness of the first substrate, or a thickness of the partition plate is less than a thickness of the second substrate,
the liquid crystal cell further includes ground electrodes respectively disposed on a surface of the first substrate facing to the partition plate and a surface of the second substrate facing to the partition plate, and
the liquid crystal phase shifter further comprises a first alignment layer and a second alignment layer, wherein the first alignment layer is disposed on a surface of the ground electrode on the first substrate away from the first substrate, and the second alignment layer is disposed on a surface of the ground electrode on the second substrate away from the second substrate.

2. The liquid crystal phase shifter according to claim 1, wherein the partition plate is provided with at least one first through hole, and the first microstrip line is electrically connected to the second microstrip line through the at least one first through hole.

3. The liquid crystal phase shifter according to claim 2, wherein an inner diameter of the at least one first through hole is less than or equal to a width of the first microstrip line; or
the inner diameter of the at least one first through hole is less than or equal to a width of the second microstrip line, wherein
the width of the first microstrip line is a width of an orthogonal projection of the first microstrip line on the partition plate;
the width the second microstrip line is a width of an orthogonal projection of the second microstrip line on the partition plate.

4. The liquid crystal phase shifter according to claim 1, wherein
a shape of the first microstrip line is the same as a shape of the second microstrip line.

5. The liquid crystal phase shifter according to claim 1, wherein
a width of the first microstrip line is the same as a width of the second microstrip line, wherein
the width of the first microstrip line is a width of an orthogonal projection of the first microstrip line on the partition plate;
the width the second microstrip line is a width of an orthogonal projection of the second microstrip line on the partition plate.

6. The liquid crystal phase shifter according to claim 1, wherein an orthogonal projection of the first microstrip line on the partition plate overlaps or partially overlaps with an orthogonal projection of the second microstrip line on the partition plate.

7. The liquid crystal phase shifter according to claim 1, wherein
an input terminal of the first microstrip line is electrically connected to an input terminal of the second microstrip line; and/or
an output terminal of the first microstrip line is electrically connected to an output terminal of the second microstrip line.

8. The liquid crystal phase shifter according to claim 1, wherein the partition plate is provided with at least one second through hole;
a first liquid crystal cavity between the partition plate and the first substrate is communicated with a second liquid crystal cavity between the partition plate and the second substrate through the at least one second through hole; and
the liquid crystal molecules are provided in the first liquid crystal cavity and the second liquid crystal cavity.

9. An electronic device, comprising the liquid crystal phase shifter according to claim 1.

10. The liquid crystal phase shifter according to claim 1, wherein the first microstrip line or the second microstrip line is provided on the partition plate along a curved line.

11. The liquid crystal phase shifter according to claim 1, wherein
a distance between the partition plate and the first substrate is the same as a distance between the partition plate and the second substrate.

12. A liquid crystal phase shifter, comprising:
a liquid crystal cell including a first substrate and a second substrate disposed opposite to each other;
a partition plate disposed between the first substrate and the second substrate;
a first microstrip line disposed on a surface of the partition plate away from the second substrate;

a second microstrip line disposed on a surface of the partition plate away from the first substrate; and liquid crystal molecules provided between the first substrate and the partition plate, and between the second substrate and the partition plate;

a first alignment layer and a second alignment layer, wherein the first alignment layer is disposed on a surface of the first microstrip line away from the partition plate, and the second alignment layer is disposed on a surface of the second microstrip line away from the partition plate.

13. The liquid crystal phase shifter according to claim 12, wherein an input terminal of the first microstrip line is electrically connected to an input terminal of the second microstrip line, and/or an output terminal of the first microstrip line is electrically connected to an output terminal of the second microstrip line.

14. The liquid crystal phase shifter according to claim 12, wherein the first microstrip line or the second microstrip line is provided on the partition plate along a curved line, and a distance between the partition plate and the first substrate is the same as a distance between the partition plate and the second substrate.

15. An electronic device, comprising the liquid crystal phase shifter according to claim 12.

16. The liquid crystal phase shifter according to claim 12, wherein a thickness of the partition plate is less than a thickness of the first substrate, or a thickness of the partition plate is less than a thickness of the second substrate.

17. The liquid crystal phase shifter according to claim 16, wherein the liquid crystal cell further includes ground electrodes respectively disposed on a surface of the first substrate facing to the partition plate and a surface of the second substrate facing to the partition plate.

18. The liquid crystal phase shifter according to claim 12, wherein a shape of the first microstrip line is the same as a shape of the second microstrip line.

19. The liquid crystal phase shifter according to claim 12, wherein:

a width of the first microstrip line is the same as a width of the second microstrip line, the width of the first microstrip line is a width of an orthogonal projection of the first microstrip line on the partition plate, and the width the second microstrip line is a width of an orthogonal projection of the second microstrip line on the partition plate.

20. The liquid crystal phase shifter according to claim 12, wherein an orthogonal projection of the first microstrip line on the partition plate overlaps or partially overlaps with an orthogonal projection of the second microstrip line on the partition plate.

* * * * *